United States Patent

[11] 3,534,832

| [72] | Inventor | Ralph C. Rediske<br>Granger, Washington |
|---|---|---|
| [21] | Appl. No. | 727,639 |
| [22] | Filed | May 8, 1968 |
| [45] | Patented | Oct. 20, 1970 |
| [73] | Assignees | Leonard Nesary<br>Zillak, Washington ;<br>Keith Hall<br>Granger, Washington |

[54] AERIAL PLATFORM STRUCTURE
14 Claims, 6 Drawing Figs.

[52] U.S. Cl. .................................................... 182/13,
182/2, 182/129
[51] Int. Cl. ........................................................ B66f 11/04
[50] Field of Search............................................. 182/2, 13,
14, 16, 141, 148, 63

[56]        References Cited
            UNITED STATES PATENTS
3,250,343   5/1966   Maloney........................   182/14

FOREIGN PATENTS
| 243,837 | 5/1963 | Australia..................... | 182/2 |
| 543,724 | 7/1957 | Canada ........................ | 182/2 |

*Primary Examiner* — Reinaldo P. Machado
*Attorney* — Graybeal, Cole and Barnard ABSTRACT: A movable aerial platform attachment for a utility tractor comprising aerial platform structure that includes a supporting frame connected to the three-point hitch of a tractor, a generally upwardly extending boom rotatably supported by said frame, elongated extension linkage means pivotally attached at one end to said boom structure and pivotally supporting an operator's platform at the other end thereof; a control bridle assembly detachably connected to said tractor and including actuators for operating the tractor brake and clutch and the gear shift, a motor for turning the steering wheel, and control elements located on the platform for controlling the actuators and motor.

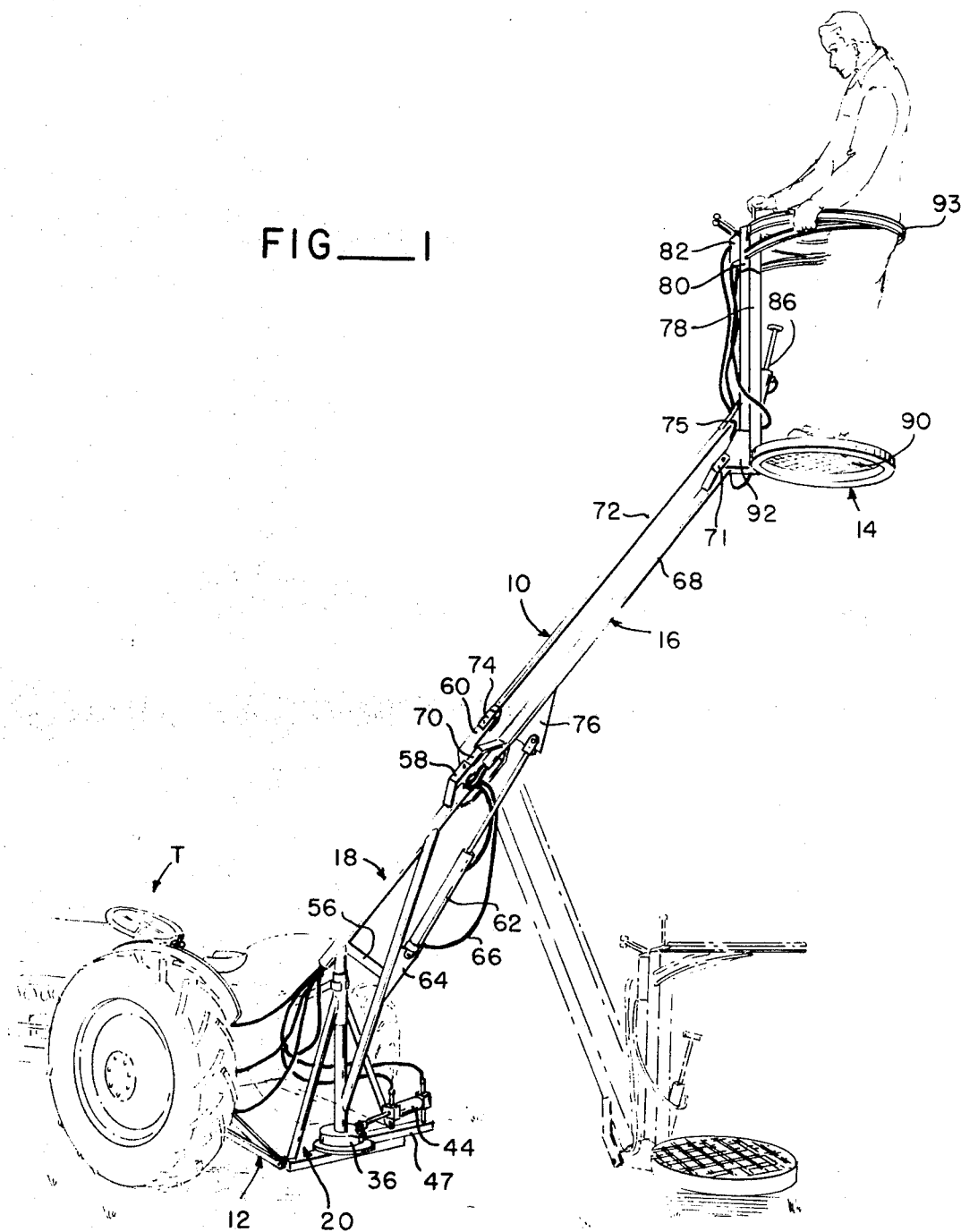
FIG—1

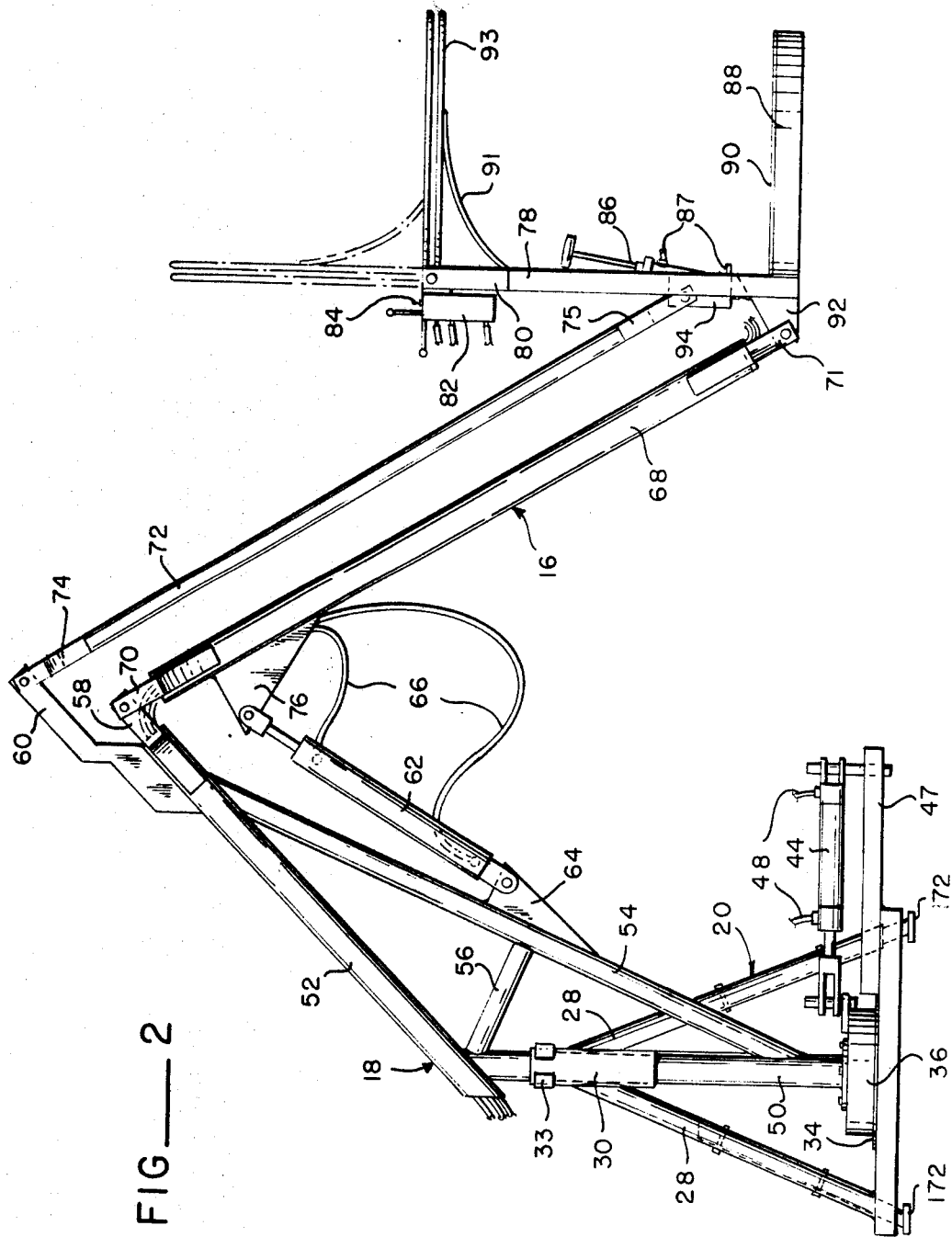

Patented Oct. 20, 1970
3,534,832
Sheet 3 of 4
FIG. 4
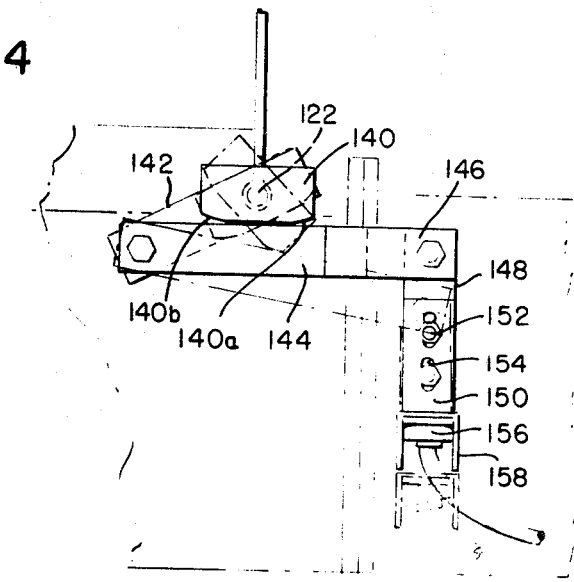
FIG. 3
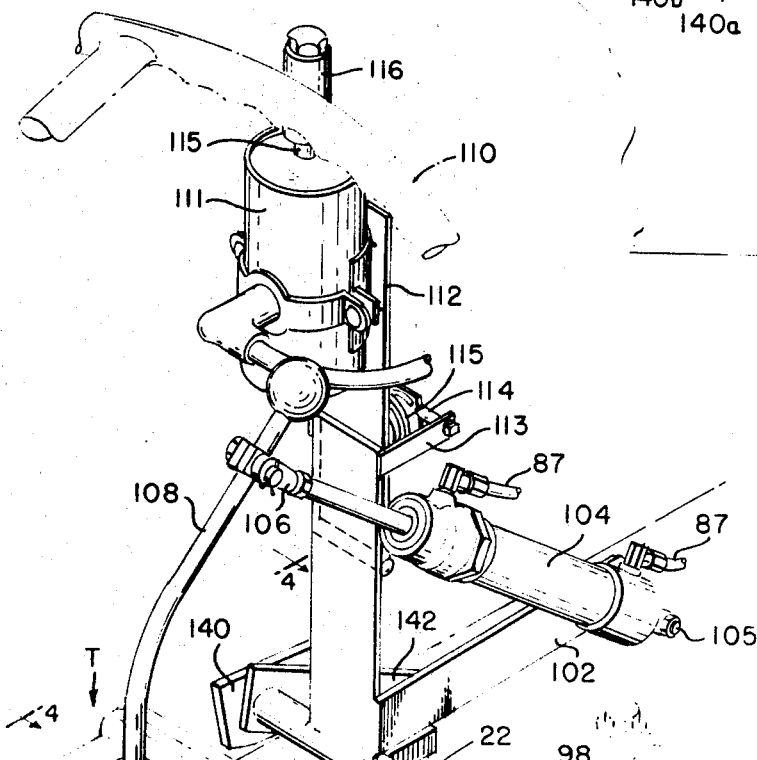
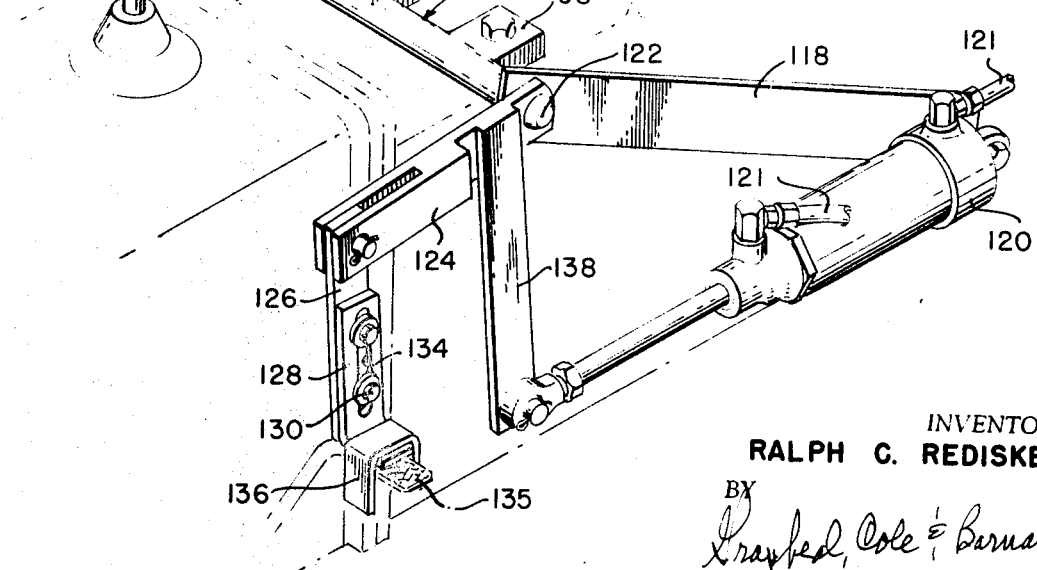
INVENTOR.
RALPH C. REDISKE
BY
Grayfred, Cole & Barnard
ATTORNEYS

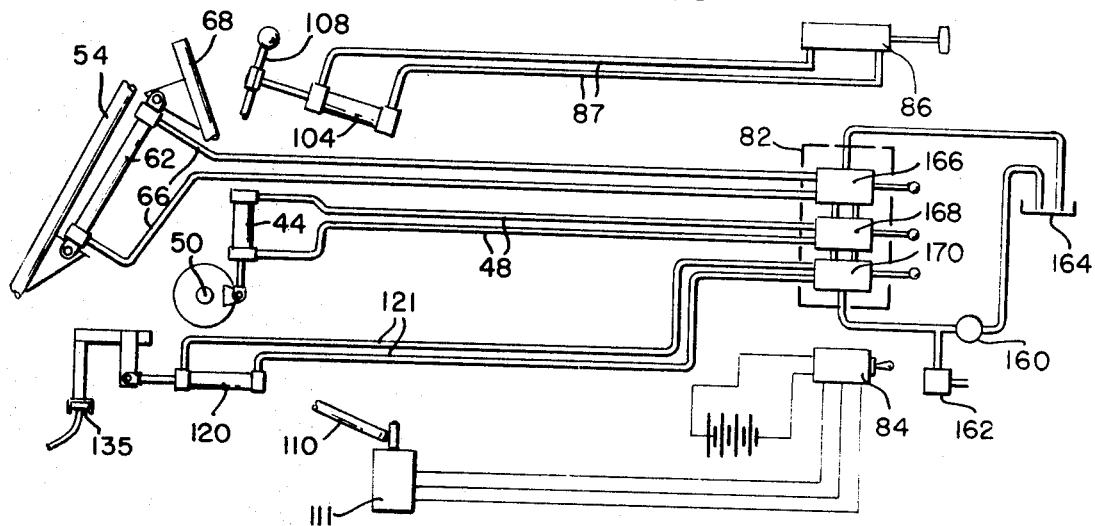
FIG__5
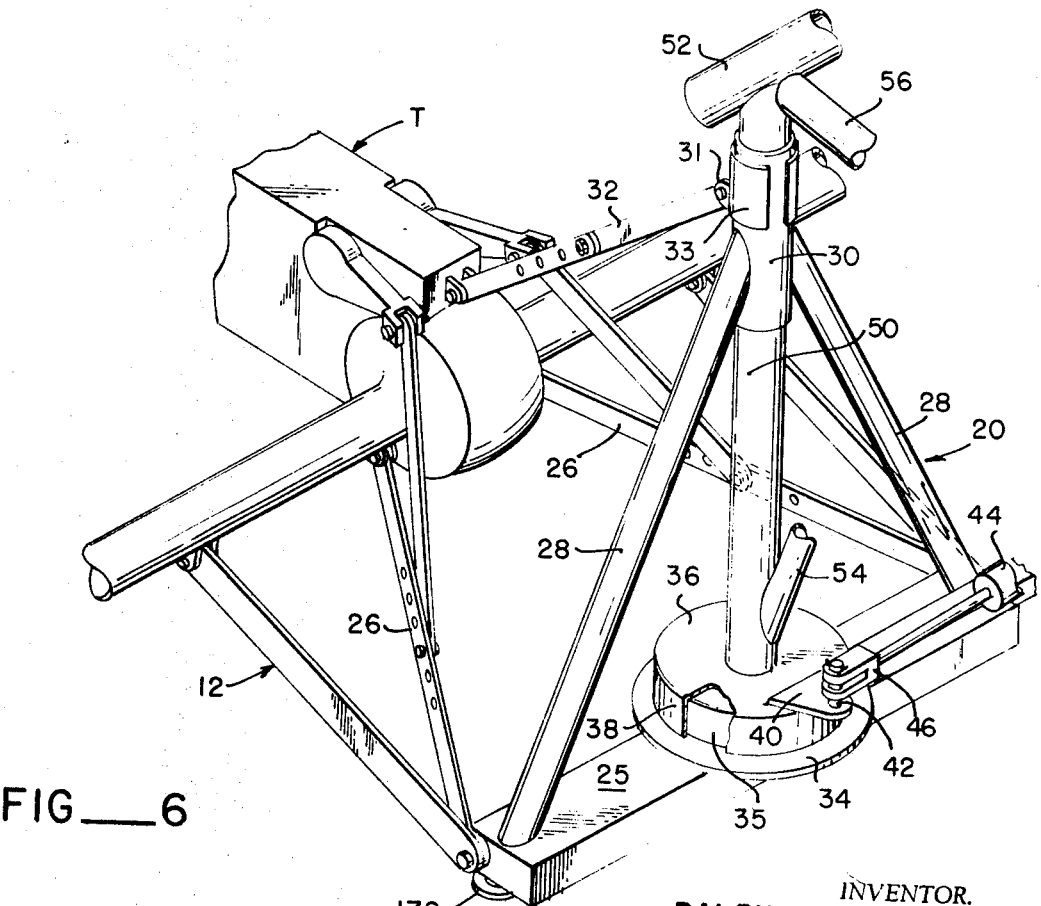
FIG__6
INVENTOR.
RALPH C. REDISKE
BY Graybeal, Cole & Barnard
ATTORNEYS

AERIAL PLATFORM STRUCTURE

BACKGROUND OF THE INVENTION

1. Field of the Invention

This invention pertains to aerial platforms and particularly to aerial platforms, such as pruning lifts, in the form of attachments for utility tractors. It also pertains to control bridle assemblies for operating the conventional controls of a utility tractor.

2. Description of the Prior Art

Many types of aerial platforms have been heretofore utilized; however, all have been integral components of a vehicle designed solely as a carrier for the platform. Examples of such vehicles may be found in the U.S. Pats. to Hotchkiss No. 2,998,861, Maloney, No. 3,250,343, and Morse No. 3,319,739. Known lifts are complex for a number of reasons. They require a separate hydraulic system and because they are mounted on a towed or self-powered vehicle a separate power plant is also needed. The result is an expensive lift which is economically out of range of the small orchard owner. Unsuccessful efforts have been made to fabricate tractor mounted lifts. Generally they have been too large and heavy, but more specifically they included no means for controlling the tractor from the lift platform and hence the operator had to lower the lift and get onto the tractor to move to the next work position. Additionally such tractor mounted devices required a separate hydraulic system and demanded excessive time to attach and detach. Complexity, again, resulted in excessive cost to the rancher.

SUMMARY OF THE INVENTION

Applicant's invention is directed to a detachable aerial platform attachment for a utility tractor of the type most ranchers, farmers or orchard owners have for general farm work. In addition, the invention is directed to a unique control bridle assembly for rapid connection to and detachment from the tractor controls. The platform and lift components as well as the bridle are attached as an integrated unit to the tractor. Basically the aerial platform has a supporting frame detachably connected to the tractor's three-point hitch. It includes means for supporting the platform on the supporting frame for movement relative to the tractor in the vertical and horizontal planes. Operation of the tractor and the position of the platform relative to the tractor are both controlled from the platform. The entire platform attachment may be easily removed to free the tractor for general use. The control bridle assembly which enables the tractor to be controlled from the platform, or for that matter from any location remote from the tractor, includes a framework for supporting actuators and linkages which actuate the brake, clutch, and gear shift or other transmission control. The bridle also provides a motor or additional actuator for turning the steering wheel.

Accordingly it is among the many features of this from to provide a tractor mounted aerial platform unit which is uniquely simple in design and construction and hence light in weight and inexpensive. The invention utilizes quick coupling of its hydraulic lines to the tractor's hydraulic system and can be mounted on and disconnected from the tractor in about fifteen minutes. The operator can advance and stop the tractor from the platform and thus is not required to leave his working position. The invention reduces labor costs since time is not lost by the operator's leaving the platform to move the tractor. The invention permits the use of electrical or hydraulic pruning equipment from the operator's platform. The invention makes use of an item of farm equipment which is always maintained and in condition for use. Since the tractor is fully maneuverable from the platform it is not necessary to have a lift which rotates 360°. The invention can be adapted to any conventional farm utility tractor having a three-point hitch with only minor alterations in specific structure components. The invention has a wide application in that it can be used for painting, pruning, picking, or virtually any job that requires the user to be in an elevated position.

BRIEF DESCRIPTION OF THE DRAWINGS

FIG. 1 is an isometric view of the aerial platform shown attached to a utility tractor;

FIG. 2 is a side elevational view of the aerial platform detached from the tractor;

FIG. 3 is an isometric view of the control bridle assembly used in conjunction with the aerial platform attachment;

FIG. 4 is a fragmentary side elevation taken along the line 4–4 of FIG. 3 showing the brake side of the control bridle assembly; and FIG. 5 is a schematic hydraulic and electrical diagram for controlling the operation of the platform and the position of the tractor; and FIG. 6 is a partial perspective view showing the base and actuator for the boom structure.

DESCRIPTION OF THE PREFERRED EMBODIMENTS

The aerial platform attachment is best shown generally in FIG. 1 and includes aerial platform structure 10, secured to the three-point hitch 12 of a tractor T. The aerial platform structure includes a platform 14 that suitably supports a workman, an elongated extension linkage means 16, a boom structure 18 that is pivotally secured to the linkage means and is rotatably secured at its lower end in a supporting frame 20. The supporting frame is secured to the three-point hitch of the tractor. The aerial platform attachment also includes a control bridle assembly 22, best shown in FIG. 3, which connects the controls of the tractor to a control panel on the platform as will hereinafter be described. The control bridle assembly permits operation of the clutch and brake, the steering wheel, and the gear shift of the tractor whereas other controls operate the vertical and horizontal position of the platform relative to the tractor. Thus, as may be readily seen, the workman on the platform may position the tractor and the platform relative to the tractor without leaving his location on the platform. As may be more readily seen from the following description the aerial platform attachment, including the aerial platform structure and the control bridle assembly, is easily and quickly removed or attached providing the orchard owner with a necessary implement at a fraction of its otherwise obtainable cost.

Referring to FIGS. 2 and 6, the supporting frame 20 comprises a rectangular base member or block 25 that is detachably bolted to the spaced lower arms 26 of a conventional three-point hitch 12 of the tractor T. A pair of tubular side braces 28 are fixed to the upper surface of the base member adjacent its outer ends and are fixed at their upper ends to a sleeve 30. The sleeve is provided with a split collar 33 having an apertured bracket 31 to which is detachably pinned an upper arm 32 of the three-point hitch. The split collar is secured as by welding to sleeve 30. As may be readily seen the supporting frame forms a rigid but detachable support that may be quickly secured to and detached from the tractor.

For rotatably mounting the boom structure 18, the base member 25 is provided with bearing means which includes a flat circular place 34 having an upstanding flange 35. A disc 36 having a sidewall 38 depending downwardly over the flange is supported by the upper edge of the flange. The spacing between the sidewall and the flange is limited to restrict movement to rotation. Although not shown, provision, such as a grease fitting, may be made to introduce lubricants into the space between the sidewall and the flange. A triangular plate 40 is secured to the disk 36 and is provided with an upright pin 42. For the purpose of turning the disc an actuator 44 which is of conventional piston cylinder type as are all other later described actuators unless otherwise noted, has its piston rod pivotally secured to the pin 42 by a yoke 46. Cylinder 44 is secured to a lateral extension member 47 which is fixed to the base member 25. Conventional hydraulic lines 48 (FIG. 2) are connected to the actuator in a manner well-known in the art. As may be readily seen, operation of the actuator will rotate or pivot the disc through a limited arc about a generally vertical axis.

The boom structure 18 is best shown in FIGS. 2 and 6 and includes a post or column 50 fixed to the disc 36 for rotation therewith. The post is journaled adjacent its upper end in collar 30. Fixed to the upper end of the post and extending angularly upwardly therefrom is a tubular boom arm 52. The boom arm is hollow to reduce weight and also to act as a conduit for housing the several hydraulic and electrical lines between the tractor and the platform. To further support the boom arm an elongated brace 54 is fixed to the post adjacent its lower end and to the outer end of the boom arm. A short cross brace 56 connects the elongated brace and the post for added strength. A pair of spaced connecting jaws 58 are fixed to the outer end of the boom arm and extend outwardly therefrom. A rigid extension bracket 60 is fixed to the top surface of the boom arm and extends outwardly therefrom along a plane passing generally between the connecting jaws 58. An actuator 62 similar to actuator 44 is pivotally connected to a laterally extending triangular plate 64 which is secured to elongated brace 54. The actuator is provided with conventional hydraulic lines 66 in a manner well-known in the art.

Referring to FIG. 2, the elongated extension linkage means 61 includes a tubular extension arm 68 that is provided at its inner end with a pair of spaced connecting jaws 70 which are pivotally attached to the connecting jaws 58. The extension arm is also hollow to reduce weight and to act as a conduit for housing hydraulic and electrical lines between boom arm 52 and the platform 14. A pair of similar connecting jaws 71 are fixed to the outer end of extension arm 68. An elongated rod 72 is provided with a pair of spaced connecting jaws 74 which are pivotally connected to rigid extension bracket 60 on boom arm 52. The elongated rod is maintained in spaced generally parallel relationship with extension arm 68 for a purpose and in a manner to be later described. A pair of similar connecting jaws 75 are fixed to the outer end of the elongated rod. A triangular plate 76 is rigidly fixed to the underside of the extension arm adjacent its inner end and is pivotally connected to the piston rod of actuator 62. As may be readily seen, operation of the actuator 62 will raise and lower the outer end of extension arm 68 in a vertical plane.

Platform 14 is best shown in FIG. 2 and includes a generally upstanding frame having side members 78 the upper ends of which are secured to a rectangular box 80. The box supports a control panel 82 which mounts several manually manipulated handles for valves that control the flow of fluid to the various actuators. In addition, the panel mounts an electrical switch 84 for controlling battery current to operate an additional control to be described hereinafter. A manually powered master actuator 86 is secured to one of the side members 78 of the platform frame and is connected to suitable hydraulic lines 87 for a purpose also to be later described. A ring 88 is fixed to the lower ends of the sidelegs of the frame and is covered with a heavy mesh screen 90 suitable for supporting a workman. A guardrail 93 is pivotally secured to the upper ends of side members 78 of the frame and overlies the ring 88 to hold the workman on the platform. The guardrail is provided with a brace 91 that abuts the rectangular box 80 to hold the guardrail in a horizontal position. Each side member 78 of the frame is provided at its lower end with a pivot plate 92 to which is pinned connecting plates 71 to pivotally secure the elongated extension arm 68 to the platform. Similarly, a pair of pivot plates 94 are secured to side members 78 just above the pivot plates 92 and to which plates 94 are pivotally attached connecting jaws 75 of elongated rod 72. The vertical spacing between the pivot connections of extension arm 68 and elongated rod 72 is the same at the end of the boom structure 20 and at the platform 14 so that the elongated rod and extension arm are maintained generally parallel. In this manner the platform is always held substantially level throughout its movement. As best shown in FIG. 1, the hydraulic and electrical lines housed in the extension arm are connected to the control panel 82 in a manner well-known in the art.

As thus far described it may be seen that the platform is capable of being positioned relative to the tractor. It is desirable to provide the operator in the platform with the additional versatility of positioning the tractor also. In this manner the platform may be positioned not only around branches and the like but around trees etc. also. For this purpose the control bridle assembly 22 is provided for operating the tractor controls from the platform. As is best shown in FIGS. 3 and 4, the control bridle assembly 22 includes a tubular frame member 96 having a pair of rearwardly extending brackets 98 which are solidly bolted to the tractor housing. Although only two brackets are employed others may be used or other forms of fastening means for securing the control bridle assembly may be employed for different tractor frames. In the embodiment shown an upright plate 100 is secured to the frame member 96 as by welding. The plate is provided with a rearwardly extending leg 102 that supports a slave actuator 104. Slave actuator 104 is similar to actuator 44 with the exception that it is connected to hydraulic lines 87 and is powered manually by actuator 86 on board the platform. The piston rod of the slave actuator is secured by a pivotal connector 106 to gear shift lever 108. Connector 106 is a simple clamp mechanism which can be quickly removed from lever 108. The rear end of slave actuator 104 is pivotally attached as at 105 to the outer end of leg 102. If necessary a universal type connection can be installed in shifting a particular make of tractor should the lever require some sideways movement. Also suitable provisions may be made for shifting the selector of automatic transmissions should the tractor not have a manual shift transmission. The purpose of manually operating the slave actuator 104 with master hand actuator 86 is to provide the sensitivity necessary to assure a smooth gear change so that meshing of the gears will not be forced. A conventional hydraulic cylinder is capable of supplying too much power and therefore could strip the gears in the transmission.

For the purpose of turning the steering wheel, identified by the numeral 110, an electrically powered motor 111 is secured to an extension plate 112 pivotally secured to the upper end of the upright plate 100 as is best shown in FIG. 3. A pair of brackets 113 protrude rearwardly from the upper end of the upright plate 100 and mount a buffer bar 114 at their rear ends. A coil compression spring 115 is secured to the forward side of the buffer bar and to the rear face of extension plate 112. The spring thus biases the extension plate and motor toward the forward end of the tractor. Motor 111 is reversible and operates off the tractor's electrical system. The motor is provided with a rotatable shaft 115 which is wound with a layer of resilient material 116 made of rubber or other suitable friction component. The rubber ring is positioned to tightly engage the steering wheel 110 by the action of the spring so that rotation of the motor shaft will revolve the wheel. If desired, a hydraulic motor may be used in place of the battery powered motor. The battery powered motor is preferred, however, since it is inexpensive and simple to control.

For operating the brake and clutch or the brake independently, the control bridle assembly 22, as is best shown in FIG. 3, also includes an elongated support plate 118 secured as by welding to tubular frame member 96 and which angles downwardly rearwardly of the clutch pedal on the left side of the transmission casing. The support plate has pivotally fastened to its rear end a hydraulic actuator 120 having conventional hydraulic lines 121. Actuator 120 is selectively positionable into three positions wherein its piston rod is retracted, partially extended and, finally, fully extended. It is internally spring biased for the rod to return to its midpoint position when not pressurized.

To connect the actuator 120 to the clutch and brake pedals a pivot shaft 122 is journaled in the tubular frame member 96. A yoke member 124 is rigidly secured to the end of the pivot shaft adjacent the left side of the tractor. The yoke member is pivotally secured at its forward end to an intermediate link 126 which is adjustably fastened to an L-shaped link 128 by a pair of spaced bolts 130 that are held in a slot 134 of the L-shaped link. The lower end of the L-shaped link abuts against the clutch pedal of the tractor. The clutch pedal is shown in phantom lines and is identified by the numeral 135. A shoe 136 in the form of an inverted U-shaped strip of metal is secured to the lower end of the L-shaped link and extends downwardly along either side edge of the pedal to guide the L-shaped link into abutment with the pedal. An operator link 138 is rigidly secured to yoke member 124 adjacent the pivot shaft 122 and is pivotally secured at its free end to the piston rod of actuator 120. To depress the clutch pedal the piston rod of the actuator is moved from its central position to a retracted position. The yoke member is thus swung downwardly and the pedal depressed. Adjustments to provide sufficient depression of the pedal to release the clutch are made by adjusting the position of the bolts 130 in the slot 134. When the piston rod is returned to its midpoint position the pedal returns to its original position and the clutch is engaged.

It is sometimes desirable to brake the tractor simultaneously with the depression of the clutch and sometimes it is desired that the brake be operated independently of the clutch. For this purpose and with reference to FIG. 4, the pivot shaft 122 also extends out of the right hand side of the tubular frame member 96 in the general location of the brake pedal. As best shown in FIG. 4, a cam 140, having a forward cam surface 140a and a rear cam surface 140b, is rigidly secured to the protruding end of the pivot shaft. Rigidly secured to the righthand end of the tubular frame member 96 is a short, downwardly and rearwardly extending brace 142. Pivotally secured to the lower end of brace 142 is a follower arm 144 the forward end of which is in the form of a yoke 146. The upper surface of the follower rod engages the cam 140 and as the cam is rotated in either direction from its central position the follower rod is pivoted downwardly. An intermediate link 148 is pivotally secured to the yoke 146 and is adjustably fastened to an L-shaped link 150 by a pair of spaced bolts 152 that are held in a slot 154 of the L-shaped link. The lower end of the L-shaped link abuts against the brake pedal, identified by the numeral 156. A shoe 158 in the form of an inverted U-shaped strip of metal is secured to the lower end of the L-shaped link and extends downwardly along either side edge of the pedal to guide the shoe into abutment with the pedal. As may be readily seen the brake pedal is also operated by the actuator 120. In the position shown in solid lines in FIGS. 3 and 4 the actuating rod of the actuator 120 is in its midpoint position and the brake and clutch pedals are in their returned or upper positions. If the piston rod of actuator 120 is retracted the clutch pedal is depressed and the cam 140 is rotated clockwise, as viewed in FIG. 4, and the brake pedal is also depressed. If the piston rod of the actuator is extended from its midpoint position, the clutch pedal remains in its returned position but the cam is rotated counterclockwise and the brake pedal is again depressed. Thus, the brake may be applied independently of the clutch.

With reference to FIG. 5, the actuators are connected by their respective hydraulic lines to several manually operated valves that direct the flow of pressurized fluid from the tractor's pump 160. The tractor is also provided with a suitable relief valve 162 and a reservoir 164, as is conventional. A valve 166 has three positions. In the first, the fluid is fed into the upper end of the actuator 62 while the fluid in the lower end is bled through an orifice to the reservoir 164. In the second position the fluid is fed into the lower end of the actuator 62 while the fluid in the upper end of the actuator is bled through an orifice into the reservoir. In the third position the fluid in the actuator 62 is trapped and its piston rod is held rigid. A valve 168, identical with the valve 166, is provided to control the boom rotation actuator 44. A valve 170 is connected to the hydraulic lines of clutch-brake actuator 120 and has three positions as does the valve 166. For its third position it vents the actuator to the reservoir so that the internal springs in actuator 120 return its piston rod to the midpoint position.

Operation of the aerial platform will be best understood by referring to the hydraulic diagram in FIG. 5. The supporting frame 20 is bolted to the three-point hitch of the tractor, the control bridle assembly 22 is fastened by two bolts onto the tractor and the hydraulic and electrical lines are connected into the tractor's circuit by quick connect couplers not shown. The tractor is then driven to the row of trees to be worked and the operator takes his position in the platform. The tractor is left running with the gear shift in a neutral position. To position the platform relative to the tractor the operator moves valve 166 to power actuator 62 and raises the platform. He then moves valve 168 to swing or position the platform horizontally. Valves 166 and 168 may be operated separately or at the same time. When it becomes necessary to move the tractor the operator controls the steering by the electrical switch 84, depresses the clutch pedal 135 by operating the valve 170, which will simultaneously depress the brake pedal 156, and with the manually operated actuator 86 moves the gear shift into a forward or reverse gear position. The motor is set to idle at a speed sufficient to move the tractor. The valve 170 is then operated to release the brake and engage the clutch so that the tractor will move toward its next work station. If necessary, additional independent braking is accomplished by operating the valve 170 to extend the operating rod of the actuator 120 to its furthest position. At the new destination the gear shift is placed in neutral and the brake pedal released or depressed depending upon the grade. In this manner an entire field of trees may be traversed without the operator once leaving the platform.

When the tractor is needed for general utility the aerial platform attachment is unbolted and lowered onto supporting legs 172 (FIG. 2) that are telescopically mounted in the tubular side braces 28. The hydraulic and electrical lines are removed and the aerial platform attachment is left in storage until another or the same tractor is again available.

Although the aerial platform attachment is shown with a particular tractor it is usable with various other types of vehicles with varying amounts of alteration all within the capabilities of one skilled in the art. In addition the control bridle assembly may be used for other applications besides the aerial platform attachment. For example, it may be used for various operations where remote control of a utility tractor is desired and is not limited to those situations where the operator is positioned on the attachment tool. Still further the aerial platform attachment may be used for other operations besides pruning and picking fruit trees, such as working at elevated heights on poles or buildings. It should be kept in mind that besides reversible electrical or hydraulic motors for steering the tractor, a linear throw actuator such as a cylinder and piston could be used. While it is not as practical a gear or sprocket could be mounted on the steering post and powered by gear or chain drive from the motor.

Although described in its preferred form, it is understood that various other modifications and changes in the structural details may be made without departing from the principles of the invention, and within the scope of the invention as determined by the following claims.

I claim:

1. A movable aerial platform attachment for use with a utility tractor, comprising:
   a. a supporting frame detachably connected to said tractor;
   b. a generally upwardly extending boom structure rotatably supported by said supporting frame;
   c. elongated extension linkage means pivotally attached at one end to said boom structure and pivotally supporting an operator's platform at the other end thereof; and
   d. a control bridle assembly to be detachably connected to said tractor and including means for controllably actuating the tractor controls and steering wheel from controls located on said platform.

2. The aerial platform structure of claim 1 and wherein said tractor includes a three-point hitch to which said supporting frame is detachably connected.

3. The aerial platform structure of claim 1 and wherein said supporting frame and boom structure include power means for rotating said boom structure.

4. The aerial platform structure according to claim 3 and wherein said boom structure and extension linkage means include power means for pivoting said extension linkage means.

5. The aerial platform according to claim 1 and wherein said control bridle assembly includes a first actuator means for operating the tractor brake and clutch, a second actuator means for operating the tractor gear shift, and third actuator means for controlling the tractor steering wheel.

6. A detachable aerial platform for attachment to a utility tractor having operating controls and a hydraulic power system, said attachment comprising:
 a. a working platform;
 b. means for supporting said platform on said tractor;
 c. means for moving said platform relative to said tractor in horizontal and vertical planes;
 d. means on said platform for controlling the movement of said platform; and
 e. tractor control means on said platform and its supporting means for detachable connection with said operating controls of said tractor for controlling the movement and position of said tractor.

7. The aerial platform structure of claim 6 wherein said means for supporting said platform includes a three-point hitch attached to said tractor.

8. The aerial platform attachment of claim 7, wherein said means for supporting said platform on said tractor also includes:
 a. a supporting frame attached to said three-point hitch;
 b. a boom structure pivotally mounted on said supporting frame for movement about a vertical axis; and
 c. elongated extension linkage means pivotally secured to said boom structure for movement about a horizontal axis.

9. The aerial platform attachment of claim 7, wherein said means for controlling the position of the tractor includes:
 a. means for propelling the tractor;
 b. means for stopping the tractor; and
 c. means for steering the tractor.

10. An aerial platform attachment for a utility tractor comprising:
 a. an operator's platform;
 b. means for detachably supporting said platform on said tractor including means for moving said platform relative to said tractor in horizontal and vertical planes;
 c. means on said platform for controlling the movement of said platform; and
 d. control bridle assembly means detachably connected to said tractor and operatively interconnected with said platform control means for steering and for starting and stopping said tractor.

11. The aerial platform attachment of claim 10 and wherein said means for detachably supporting said platform is mounted on a three-point hitch attached to said tractor.

12. A detachable control bridle assembly for controllably operating at least the brake, transmission shift and steering mechanism of a utility tractor by an operator situated at a location operatively connected to and yet remote from the tractor operator's normal position, comprising:
 a. first means including a first actuator detachably connected to operate said transmission shift;
 b. second means including a second actuator detachably connected to operate said brake; and
 c. third means including a third actuator detachably engaged to operate said steering mechanism.

13. The control bridle assembly according to claim 12 and wherein said second means also includes means for engaging and disengaging the clutch of a utility tractor.

14. The control bridle assembly according to claim 12 and wherein said third actuator is resiliently biased to engage said steering mechanism.